United States Patent
Cao et al.

(10) Patent No.: US 10,133,386 B2
(45) Date of Patent: *Nov. 20, 2018

(54) INTEGRATED TOUCH CONTROL DISPLAY PANEL AND TOUCH DISPLAY DEVICE

(71) Applicants: Shanghai Tianma Micro-electronics Co., Ltd., Shanghai (CN); Shanghai AVIC OPTO Electronics Co., Ltd., Shanghai (CN); Tianma Micro-electronics Co., Ltd., Shenzhen (CN)

(72) Inventors: Zhaokeng Cao, Shanghai (CN); Wantong Shao, Shanghai (CN); Gang Liu, Shanghai (CN)

(73) Assignees: SHANGHAI TIANMA MICRO-ELECTRONICS CO., LTD., Shanghai (CN); SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,461

(22) Filed: Feb. 14, 2018

(65) Prior Publication Data
US 2018/0173350 A1 Jun. 21, 2018

Related U.S. Application Data

(63) Continuation of application No. 15/132,378, filed on Apr. 19, 2016, now Pat. No. 9,933,874.

(30) Foreign Application Priority Data

Dec. 8, 2015 (CN) .......................... 2015 1 0897674

(51) Int. Cl.
*G06F 3/041* (2006.01)
*G06F 3/047* (2006.01)
*G06F 3/044* (2006.01)

(52) U.S. Cl.
CPC ............ *G06F 3/0412* (2013.01); *G06F 3/044* (2013.01); *G06F 3/047* (2013.01); *G06F 3/0416* (2013.01);
(Continued)

(58) Field of Classification Search
CPC . G06F 2203/04107; G06F 2203/04111; G06F 3/0412; G06F 3/0416; G06F 3/044; G06F 3/047; G09G 3/36
See application file for complete search history.

(56) References Cited

U.S. PATENT DOCUMENTS

2015/0268795 A1* 9/2015 Kurasawa ............. G06F 3/0418
345/174

FOREIGN PATENT DOCUMENTS

CN  104090680 A  10/2014
CN  104516561 A  4/2015
(Continued)

*Primary Examiner* — Insa Sadio
(74) *Attorney, Agent, or Firm* — Anova Law Group, PLLC

(57) ABSTRACT

The present disclosure provides an integrated touch control display panel. The integrated touch control display panel includes a display region and a peripheral circuit region located on at least one side of the display region. The display region includes a plurality of stripe shaped touch control electrodes that extend in a first direction and are sequentially arranged in a second direction which intersects with the first direction. Defining a width of a gap between the peripheral circuit region and a closest stripe shaped touch control electrode in the second direction as a first width, and defining a width of a gap between any two adjacent stripe
(Continued)

shaped touch control electrodes as a second width, the first width is greater than the second width.

18 Claims, 8 Drawing Sheets

(52) U.S. Cl.
CPC .............. *G06F 2203/04107* (2013.01); *G06F 2203/04111* (2013.01)

(56) References Cited

FOREIGN PATENT DOCUMENTS

| CN | 104937527 | | 9/2015 |
|---|---|---|---|
| CN | 105467643 | A | 4/2016 |
| JP | 2015191406 | A | 11/2015 |
| KR | 20110136118 | A | 12/2011 |

\* cited by examiner

INTEGRATED TOUCH CONTROL DISPLAY PANEL AND TOUCH DISPLAY DEVICE

This application is a continuation application of U.S. patent application Ser. No. 15/132,378 filed on Apr. 19, 2016, which claims the priority of Chinese Patent Application No. CN201510897674.0, filed on Dec. 8, 2015, the entire contents of which are incorporated herein by reference.

FIELD OF THE DISCLOSURE

The present disclosure generally relates to the touch control technologies and, more particularly, relates to an integrated touch control display panel and a touch display device.

BACKGROUND

As an input medium, a touch control display panel is by far the simplest and most convenient way for human machine interaction. Therefore, more and more products have incorporated touch control display functionalities into liquid crystal displays. Generally, a touch control display panel is divided into a display region for image display and touch control, and a peripheral circuit region located on both sides of the display region. The display region usually includes a plurality of pixel units for image displaying function and a plurality of touch control electrodes for touch control function. The peripheral circuit region often includes a plurality of shift registers which include a plurality of transistors and at least one capacitor. Thus, the peripheral circuit region contains complex wiring structures which are likely to cause signal interference to the touch control electrodes in the display region and to affect touch control precision.

The disclosed integrated touch control display panel and touch display device are directed to solve one or more of above-stated problems in the art.

BRIEF SUMMARY OF THE DISCLOSURE

Directed to solve one or more problems set forth above and other problems in the art, the present disclosure provides an integrated touch control display panel and a touch display device.

One aspect of the present disclosure includes an integrated touch control display panel. The integrated touch control display panel includes a display region and a peripheral circuit region located on at least one side of the display region. The display region includes a plurality of stripe shaped touch control electrodes that extend in a first direction and are sequentially arranged in a second direction which intersects with the first direction. Defining a width of a gap between the peripheral circuit region and a closest stripe shaped touch control electrode in the second direction as a first width, and defining a width of a gap between any two adjacent stripe shaped touch control electrodes as a second width, the first width is greater than the second width.

Another aspect of the present disclosure includes a touch display device. The touch display device includes the disclosed integrated touch control display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
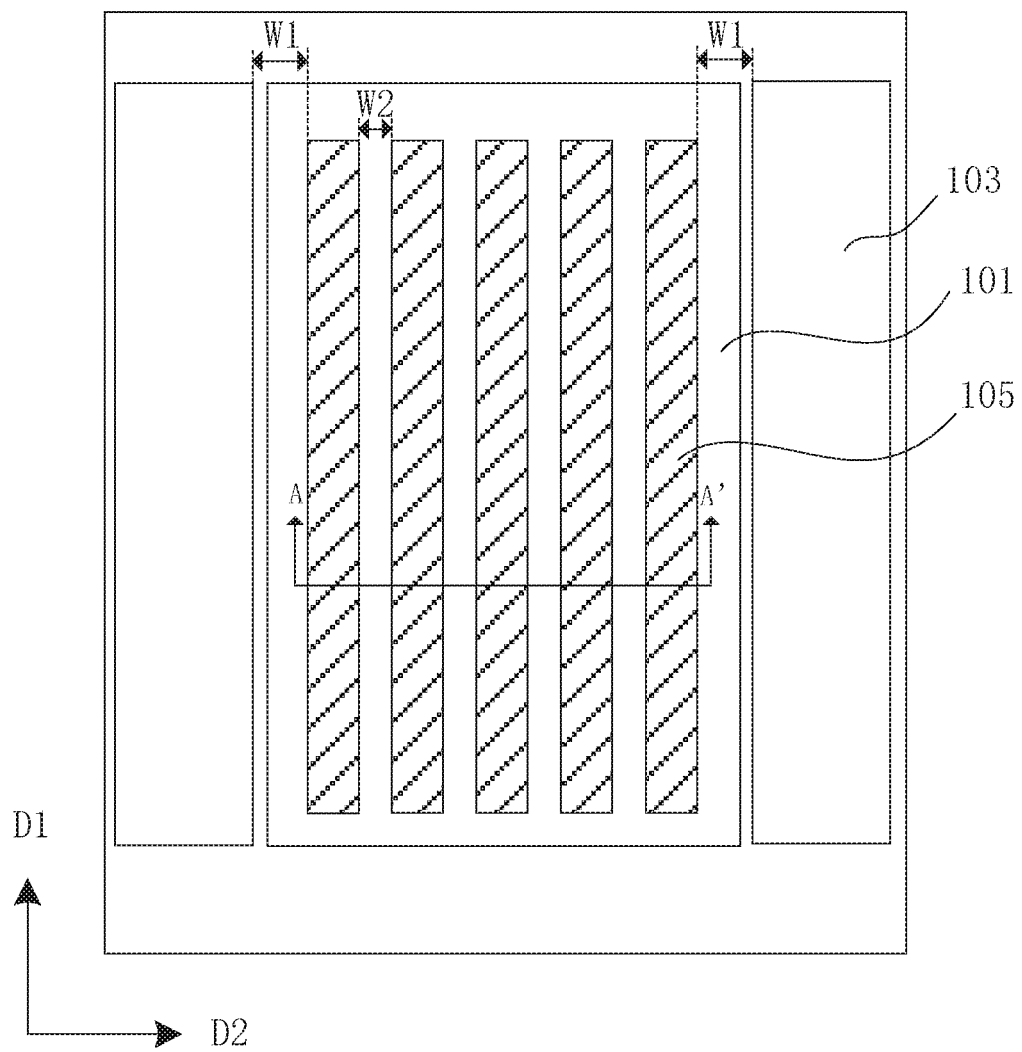
FIG. 1 illustrates a schematic view of an exemplary integrated touch control display panel according to the disclosed embodiments.

FIG. 1 illustrates a schematic view of an exemplary touch control display panel according to the present disclosure. Referring to FIG. 1, the touch control display panel 100 may include a display region 101 and a peripheral circuit region 103 on both sides of the display region 101.

The display region 101 may include a plurality of stripe shaped touch control electrodes 105. The touch control electrodes 105 may extend in a first direction D1 and may be sequentially arranged in a second direction D2. The first direction D1 may intersect with the second direction D2. The gap between the peripheral circuit region 103 and the closest stripe shaped touch control electrodes 105 along the second direction D2 may be a first width W1. The gap between any two adjacent touch control electrodes 105 along the second direction D2 may be a second width W2. The first width W1 may be greater than the second width W2.

Figure 2:
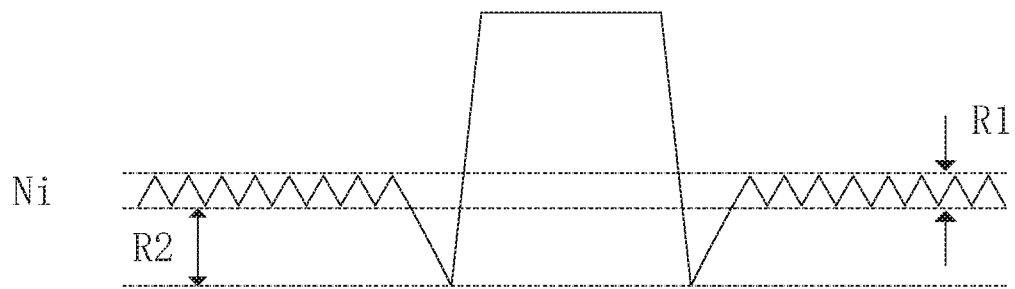
FIG. 2 illustrates a schematic view of signal interference to the touch control electrodes caused by the peripheral circuit region of the integrated touch control display panel according to the disclosed embodiments.

FIG. 2 illustrates a schematic view of signal interference to the touch control electrodes caused by the peripheral circuit region of the integrated touch control display panel according to the present disclosure. Referring to FIG. 2 in conjunction with FIG. 1, in the display region 101, the touch control electrode 105 that is closest to the peripheral circuit region 103 may receive, for example, a touch control signal Ni.

Specifically, the signal Ni may include a first ripple R1 and a second ripple R2 due to external signal interference. The second ripple R2 may be caused by the scanning of the touch control electrodes 105. The first ripple R1 may be caused by signal interference from wiring in the peripheral circuit region 103. Lab test results can show that a large ratio of the first ripple R1 to the second ripple R2 may affect calculation of touch control point. Thus, the ratio should not be too large. In other words, if the ratio is greater than a predetermined threshold, the calculation of touch control point may be affected and the ratio is considered as "too large."

A touch control precision threshold may be defined as $$\lambda = \frac{R2}{R1}.$$

Through simulations and calculations, it can be found that when the touch control precision threshold $\lambda$ is approximately greater than 1.2, the touch control IC that processes touch control signals may be more likely to calculate a precise location of the touch control point in an accelerated manner. Other precision threshold values may also be used depending on specific applications and touch control types, etc.

Tables 1-3 include three sets of different combinations of the first width W1 and the second width W2 together with different touch control precision thresholds $\lambda$ calculated from the different combinations. Tables 1-3 are used to illustrate the effects of different combinations of the first width W1 and the second width W2 on the touch control precision thresholds $\lambda$.

TABLE 1

| W1 (μm) | W2 (μm) | λ |
|---|---|---|
| 6 | 6 | 1 |
| 5 | 5 | 1 |
| 4 | 4 | 1 |

In Table 1, when the first width W1 is equal to the second width W2, the touch control precision threshold is $\lambda=1$. This value is smaller than a normalized regional threshold of 1.2. Thus, the designs with the first width W1 equal to the second width W2 may be undesirable for the touch control IC to calculate precise location of touch control point.

TABLE 2

| W1 (μm) | W2 (μm) | λ |
|---|---|---|
| 8.3 | 6 | 1.26 |
| 7 | 5 | 1.26 |
| 5.5 | 4 | 1.255 |

In Table 2, when the first width W1=8.3 μm and the second width W2=6 μm, the touch control precision threshold is $\lambda=1.26$. When the first width W1=7 μm and the second width W2=5 μm, the touch control precision threshold is $\lambda=1.26$. When the first width W1=5.5 μm and the second width W2=4 μm, the touch control precision threshold is $\lambda=1.255$. Thus, the designs with the first width W1 greater than the second width W2 may have the touch control precision thresholds $\lambda$ greater than the normalized regional threshold 1.2. The table 2 indicates that when the first width W1 is equal to or greater than about 1.4 times the second width W2, the corresponding touch control precision threshold $\lambda$ is greater than the normalized regional threshold 1.2.

Such design may be desirable for the touch control IC to calculate precise location of touch control point in an accelerated manner.

TABLE 3

| W1 (μm) | W2 (μm) | λ |
|---|---|---|
| 10 | 6 | 1.35 |
| 8 | 5 | 1.38 |
| 6 | 4 | 1.28 |

In Table 3, when the first width W1=10 μm and the second width W2=6 μm, the touch control precision threshold is $\lambda=1.35$. When the first width W1=8 μm and the second width W2=5 μm, the touch control precision threshold is $\lambda=1.38$. When the first width W1=6 μm and the second width W2=4 μm, the touch control precision threshold is $\lambda=1.28$.

Thus, the designs with the first width W1 greater than the second width W2 may have the touch control precision thresholds $\lambda$ greater than the normalized regional threshold 1.2. The highest touch control precision threshold $\lambda$ in table 2 reaches 1.38. The table 3 indicates that, when the first width W1 is equal to or greater than about 1.6 times the second width W2, the corresponding touch control precision threshold $\lambda$ is substantially greater than the normalized regional threshold 1.2. Such design may be desirable for the touch control IC to calculate precise location of touch control point in an accelerated manner.

Further, according to the three data sets above, when the ratio of the first width W1 to the second width W2 is 1.67, the corresponding touch control precision threshold is $\lambda=1.35$; when the ratio of the first width W1 to the second width W2 is 1.6, the corresponding touch control precision threshold is $\lambda=1.38$; and when the ratio of the first width W1 to the second width W2 is 1.5, the corresponding touch control precision threshold is $\lambda=1.28$. It can be found that, when the ratio of the first width W1 to the second width W2 is approximately 1.6, the corresponding design may be more desirable for the touch control IC to calculate precise locations of touch control points in an accelerated manner.

It should be noted that the first widths W1 and the second widths W2 in the three data sets are exemplary and for illustrative purposes. They should not be considered as limitations to the scope of the present invention. Specific products may choose other values for the first width W1 and second width W2 as long as the first width W1 is greater than the second width W2. In other products, the first width W1 may be equal to or greater than 1.4 times the second width W2. Alternatively, the first width W1 may be equal to or greater than 1.6 times the second width W2.

Figure 3:
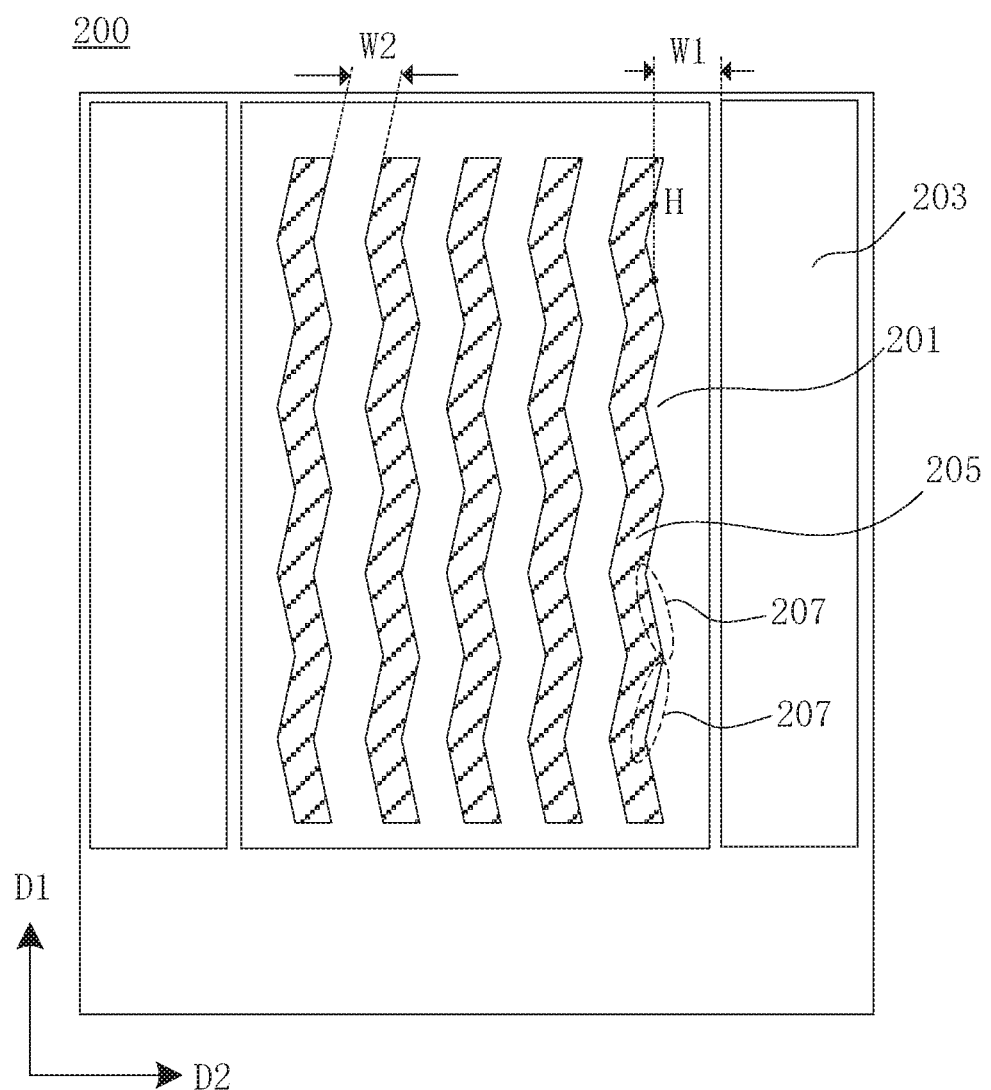
FIG. 3 illustrates a schematic view of another exemplary integrated touch control display panel according to the disclosed embodiments.

FIG. 3 illustrates a schematic view of another exemplary integrated touch control display panel according to the present disclosure. Referring to FIG. 3, the integrated touch control display panel 200 may include a display region 201 and a peripheral circuit region 203 on both sides of the display region 201. The display region 201 may include a plurality of stripe shaped touch control electrodes 205. The touch control electrodes 205 may extend in the first direction D1 and may be sequentially arranged in the second direction D2. The first direction D1 may intersect with the second direction D2.

The difference between the integrated touch control display panels shown in FIG. 1 and FIG. 3 may include the shape of the touch control electrodes. The touch control electrodes 205 shown in FIG. 3 are in the shape of wavy or zig-zag stripes while the touch control electrodes 105 shown in FIG. 1 are in the shape of straight stripes. All the touch control electrodes 205 may have the same shape, such as a triangular wave shape, a circular wave shape, a sine wave shape, etc. Due to the wavy stripe shape, the gap between the peripheral circuit region 203 and the closest stripe shaped touch control electrode 205 along the second direction D2 may be defined differently.

For example, for the touch control electrode 205 that is closest to the peripheral circuit region 203, some portions of such touch control electrode 205 may be closer to the peripheral circuit region 203 than some other portions of such touch control electrode 205. The first width W1 may be determined based on the shape of the touch control electrode 205.

In certain embodiments, the wavy stripe of the touch control electrode 205 that is closest to the peripheral circuit region 203 may be divided into a plurality of equal-length short slopes 207 and each short slope 207 has a middle point H which has equal distance to both ends of the short slope 207. The distance between the middle point H and the edge of the peripheral circuit 203 along the second direction D2 may be a first width W1. The gap between any two adjacent touch control electrodes 205 along the second direction D2 may be a second width W2. The first width W1 may be greater than the second width W2.

In certain other embodiments, the touch control electrode 205 that is closest to the peripheral circuit region 203 may have an irregular shape. In this case, the shortest distance between the irregular shape touch control electrode and the adjacent edge of the peripheral circuit region 203 may be defined as the first width W1. Regular shapes may also be applicable.

Further, exemplary values of the first width W1 and the second width W2 and the effects of different combinations of the first width W1 and the second width W2 on the touch control precision thresholds λ may also be illustrated in Tables 1-3. The same descriptions for Tables 1-3 may also apply to the integrated touch control display panel shown in FIG. 3. FIG. 3 may be used to illustrate the definitions of the first width W1 and the second width W2 when the touch control electrodes 205 are in shapes other than straight stripes.

Figure 4:
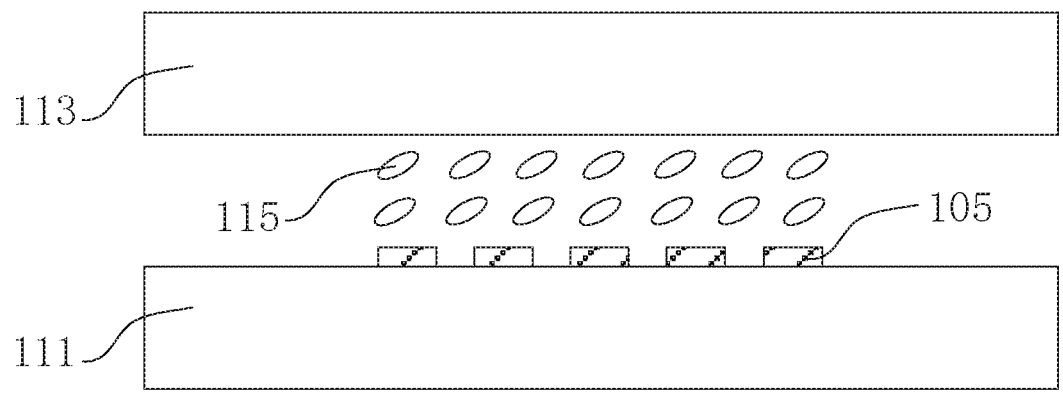
FIG. 4 illustrates a cross-sectional view along the AA' line in FIG. 1.

FIG. 4 illustrates a cross-sectional view along the AA' line in FIG. 1. Referring to FIG. 4 and FIG. 1, the integrated touch control display panel 100 may include an array substrate 111, a color film substrate 113 facing toward the array substrate 111, and a liquid crystal layer sandwiched between the array substrate 111 and the color film substrate 113.

The array substrate 111 may include a plurality of gate electrodes, gate electrode scanning lines, source electrodes, drain electrodes, pixel electrodes connected to the drain electrodes, and a plurality of insulating layers configured between the metal electrodes and transparent metal electrodes. The electrodes may be in any appropriate structures, may be formed in any appropriate form or layers, and any appropriate interconnect may be used to connect or insulate the electrodes.

Further, the integrated touch control display panel 100 may include a common electrode layer. The common electrode layer may be made of a transparent conducting film, such as a layer of indium tin oxide (ITO). The common electrode layer may be divided into a plurality of stripe shaped electrodes 105 that are insulated from each other. The liquid crystals 115 in the liquid crystal layer may block or pass light depending on the orientation. The liquid crystals 115 may be rotated by an electric field applied between a pixel electrode (not shown) and a common electrode 105. By rotating the liquid crystals, light may be blocked or passed for each pixel. The stripe shaped electrodes 105 may extend in the first direction D1 and may be sequentially arranged in the second direction D2. When the integrated touch control display panel 100 is performing image display function or during the image display phase, the stripe shaped electrodes 105 together with the pixel electrodes (not shown) may control the rotation of the liquid crystals 115 to display images. Further, when the integrated touch control display panel 100 is performing touch control function or during the touch control phase, the stripe shaped electrodes 105 shown in FIG. 4 may have functions equivalent to the touch control electrodes 105 shown in FIG. 1, such as receiving or looping back touch control driving signals, and executing touch control function.

Further, the integrated touch control display panel 100 may be configured in a capacitive touch control mode. The capacitive touch control mode may be divided into self capacitive touch control and mutual capacitive touch control. The mutual capacitive touch control may require two types of electrodes coupled with each other. One type of electrodes may be touch control driving electrodes. The other type of electrodes may be touch control detecting electrodes.

The touch control driving electrodes may be used to receive the driving signals transmitted from the integrated circuit, such as touch control IC. The touch control detecting electrodes may be capacitively coupled with the touch control driving electrodes to sense touch control and to feed the sensed signals back to the integrated circuit or touch control IC. The touch control IC may then determine the position information and other information based on the sensed signals.

The touch control driving electrodes and the touch control detecting electrodes may intersect with each other in the touch control display panel. For example, one type of electrodes may be configured on the array substrate, and the other type of electrodes may be configured on the color film substrate. Alternatively, one type of the electrodes may be configured inside the touch control display panel, and the other type of electrodes may be configured outside the touch control display panel. The type of electrodes inside the touch control display panel may be configured on either the array substrate or the color film substrate. More variations of configurations for the touch control driving electrodes and the touch control detecting electrodes may also be used.

Figure 5:
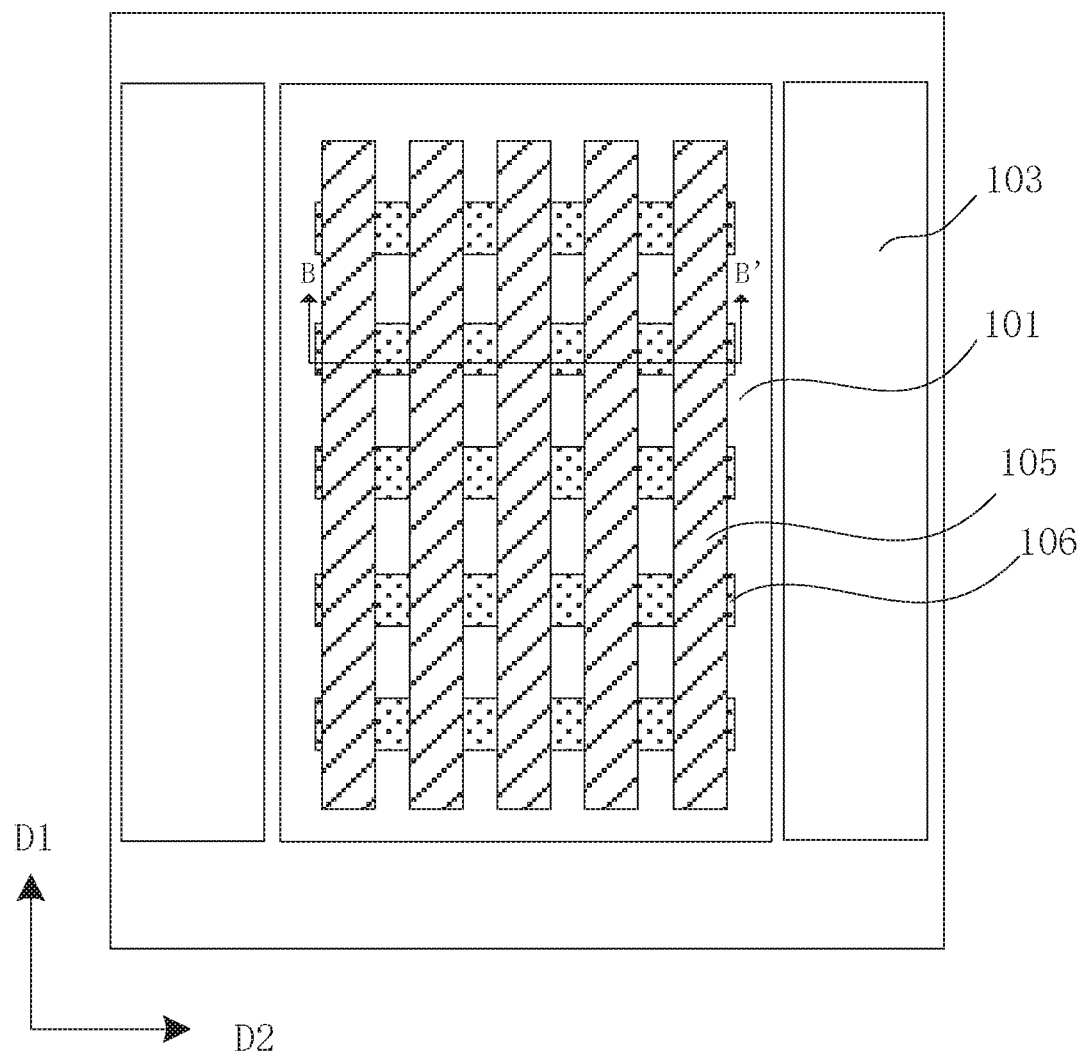
FIG. 5 illustrates a schematic view of another exemplary integrated touch control display panel according to the disclosed embodiments.
Figure 6:
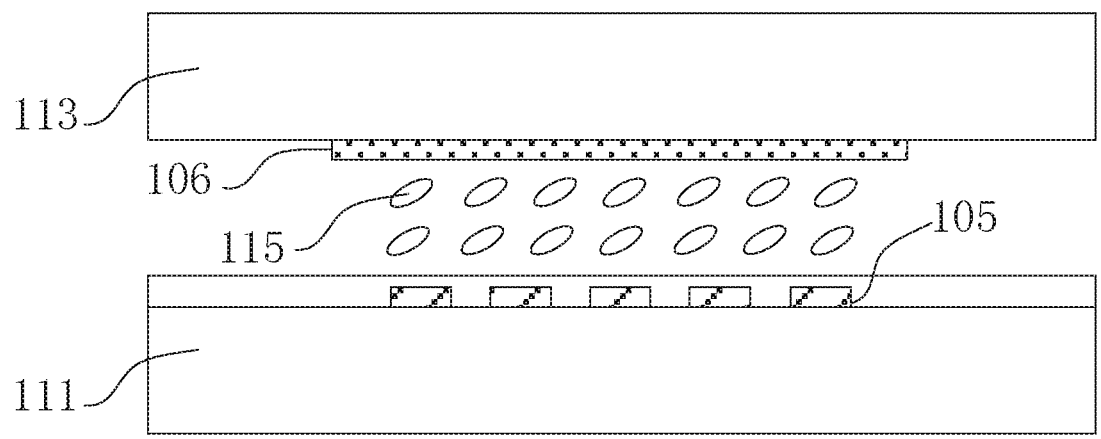
FIG. 6 illustrates a cross-sectional view along the BB' line in FIG. 5.

FIG. 5 illustrates a schematic view of another exemplary integrated touch control display panel according to the present disclosure. FIG. 6 illustrates a cross-sectional view along the BB' line in FIG. 5. FIG. 5 and FIG. 6 are similar to FIG. 1 and FIG. 4 and use the same labels from FIG. 1 and FIG. 4. Referring to FIG. 5, the touch control display panel 100 may include a display region 101 and a peripheral circuit region 103 on both sides of the display region 101. The display region 101 may include a plurality of stripe shaped touch control electrodes 105. The touch control electrodes 105 may extend in a first direction D1 and may be sequentially arranged in a second direction D2. The first direction D1 may intersect with the second direction D2. In addition, FIG. 5 and FIG. 6 show electrodes 106 configured facing toward the touch control electrodes 105. Specifically, referring to FIG. 5 and FIG. 6, the stripe shaped electrodes 105 may operate as the touch control driving electrodes during the touch control phase. Under this circumstance, the other electrodes 106 that intersect with the stripe shaped electrodes 105 may be the touch control detecting electrodes.

The stripe shaped electrodes 105 may be configured on the array substrate 111 and the other electrodes 106 may be configured on the color film substrate 113. Further, referring to FIG. 5, the stripe shaped electrodes 105 may extend in the first direction D1 and may be sequentially arranged in parallel in the second direction D2. The other electrodes 106 may extend in the second direction D2 and may be sequentially arranged in parallel in the first direction D1. However, other configurations may also be used.

For example, the stripe shaped electrodes 105 may extend in the second direction D2 and may be sequentially arranged in parallel in the first direction D1. At the same time, the other electrodes 106 may extend in the first direction D1 and may be sequentially arranged in parallel in the second direction D2 as long as the stripe shaped electrodes 105 and the other electrodes 106 intersect with each other. Further, the specific layering sequence of the stripe shaped electrodes 105 and the other electrodes 106 may be configured differently and is not intended to be limiting.

Figure 7:
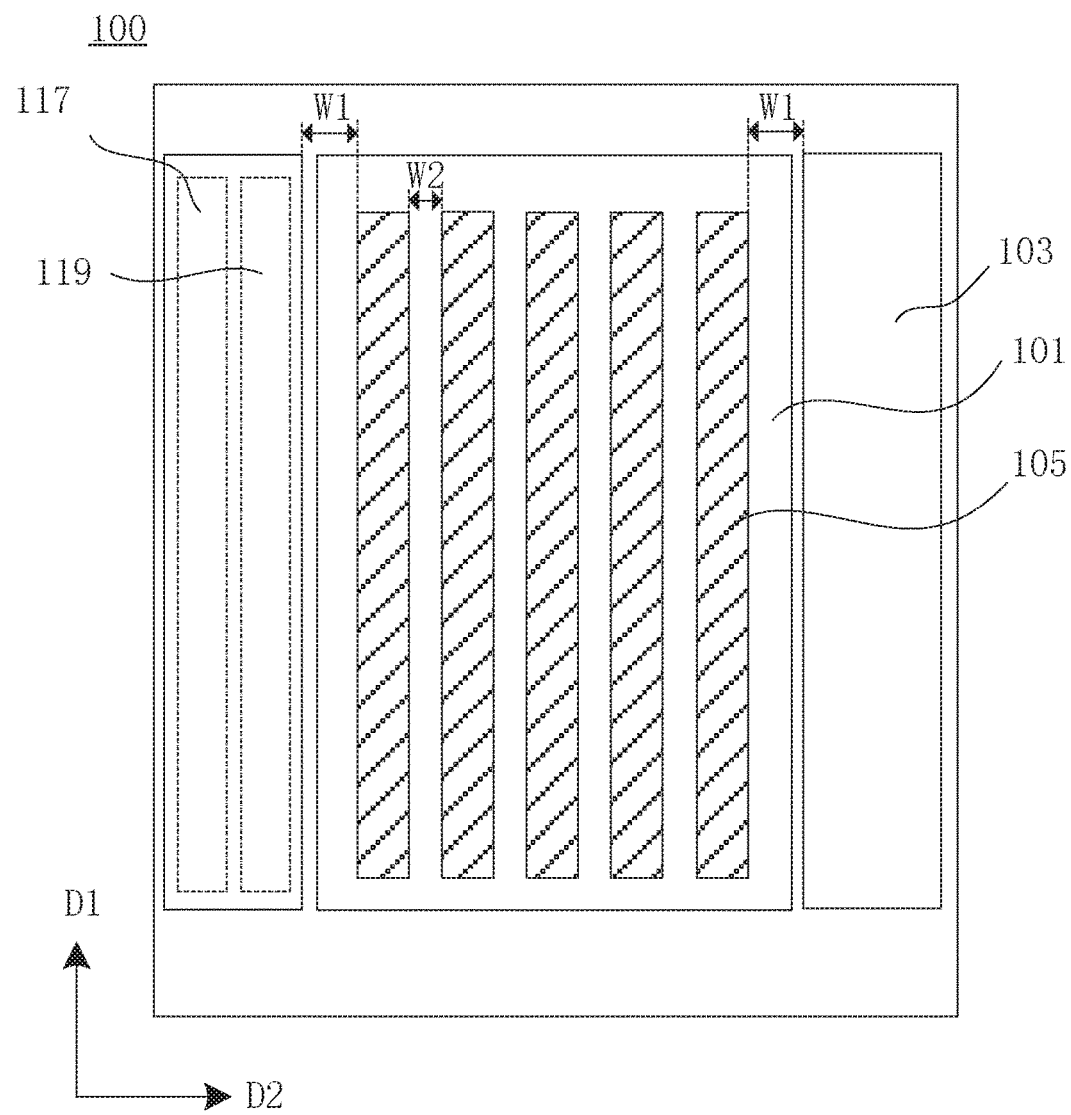
FIG. 7 illustrates a schematic view of another exemplary integrated touch control display panel according to the disclosed embodiments.

FIG. 7 illustrates a schematic view of another exemplary integrated touch control display panel according to the present disclosure. Referring to FIG. 7, the integrated touch control display panel 100 may include a display region 101 and a peripheral circuit region 103 on both sides of the display region 101.

The display region 101 may include a plurality of stripe shaped touch control electrodes 105. The touch control electrodes 105 may extend in the first direction D1 and may be sequentially arranged in the second direction D2. The first direction D1 may intersect with the second direction D2. FIG. 7 is similar to FIG. 1 and uses same labels as in FIG. 1. In addition, FIG. 7 shows a first sub-region 117 and a second sub-region 119 in the peripheral circuit region 103.

Specifically, the first sub-region 117 may be a TFT component sub-region and the second sub-region 119 may be a system bus sub-region. The system bus sub-region 119 may be located on the inner side of the peripheral circuit region 103 and may be closer to the touch control electrodes 105. The system bus sub-region 117 may include a plurality of buses (not shown) and may contain dynamically changing timing signal buses (not shown). Optionally, the timing signal buses may be located on the side of the peripheral circuit region 103 that is closer to the touch control electrodes 105.

The timing signal buses may carry dynamically changing timing signals and may often have large load. When the timing signal buses are located on the far side of the peripheral circuit region 103 that is distant from the display region 101 (or is the outermost edge of the display panel), the heavily loaded timing signal buses may be susceptible to or damaged by external static discharges considering that modern display panel designs usually have very narrow bezel. Thus, such configuration that the timing signal buses are located on the near side of the peripheral circuit region 103 that is closer to the touch control electrodes 105 may be desired for the protection of the timing signal buses and for improving the reliability of the integrated touch control display panels.

Alternatively, the first sub-region 117 may be the system bus sub-region and the second sub-region 119 may be the TFT component sub-region. In this case, the TFT component sub-region may be located on the near side of the peripheral circuit region 103 that is closer to the touch control electrodes 105. Specifically, the TFT component sub-region 119 may include buffers (not shown). The buffers may be located on the near side of peripheral circuit region 103 that is closer to the touch control electrodes 105.

For illustrative purposes, the buffers may include a plurality of inverters connected in series. In the peripheral driver circuits, the buffers are often used to amplify the scanning signals prior to the scanning signals being transmitted to scanning lines in the display region 101. Thus, the buffers may be located at the end of the signal outputs in the peripheral circuit region 103, i.e., placing the buffers on the near side of the peripheral circuit region 103 that is closer to the touch control electrodes 105. By using such configuration, it may effectively reduce unnecessary wire crossing and routing and also reduce the area occupied by the peripheral circuits, reducing the bezel dimension. Because the wire crossing and routing are reduced, the potential risk of static discharge during the display panel fabrication process and actual image display process may be reduced as well.

Further, whether the TFT component sub-region is located on the near side of the peripheral circuit region 103 that is closer to the touch control electrodes 105 or the system bus sub-region is located on the near side of the peripheral circuit region 103 that is closer to the touch control electrodes 105, the values of the first width D1 and the second width D2, and combinations of the values of the first width D1 and the second width D2 for determining the touch control precision thresholds $\lambda$ may be referred to Tables 1-3 and the accompanying descriptions.

In certain other embodiments, a shielding structure may be formed between the touch control electrodes and the peripheral circuit region to shield the signal interference from the peripheral circuit region to the touch control electrodes. The shielding electrodes may receive the same driving signals as the touch control electrodes or may be electrically connected to ground. The shielding electrodes and the touch control electrodes may be formed in the same layer and may be made of the same metallic material or ITO. Because the common electrodes may operate as the touch control electrodes, the shielding electrodes and the common electrodes may be formed in the same step of the fabrication process and may be made of the same ITO. When the display region is getting closer to the peripheral circuit region, the signal interference may not increase due to the shielding effect of the shielding structure.

Figure 8:
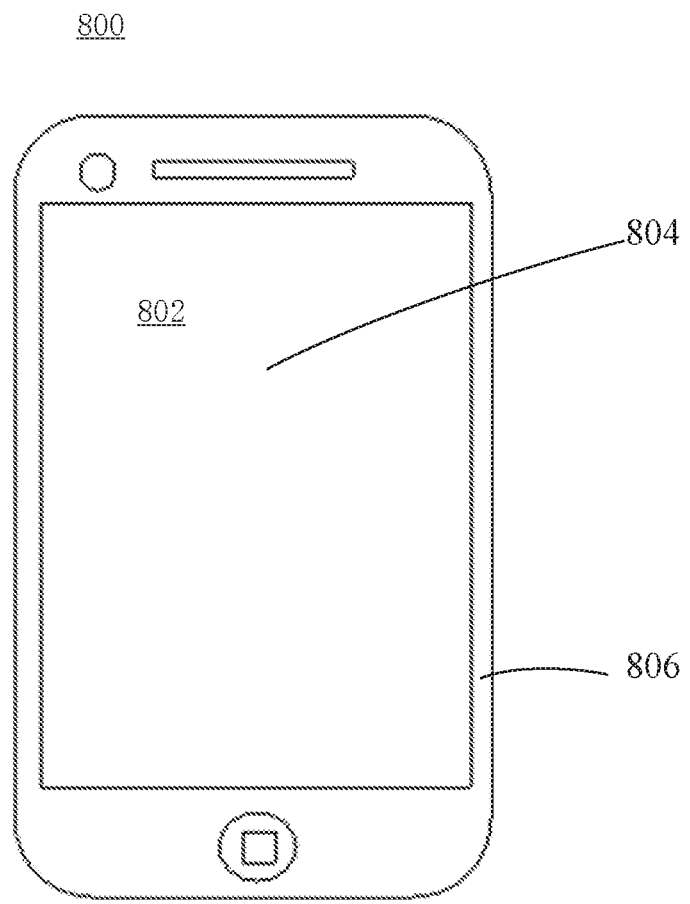
FIG. 8 illustrates a schematic view of an exemplary touch display device according to the disclosed embodiments.

FIG. 8 illustrates a schematic view of an exemplary touch display device according to the present disclosure. Referring to FIG. 8, the touch display device 800 may be a smart phone. The touch display device may include an integrated touch control display panel 802. The integrated touch control display panel may include a display region 804 and a peripheral circuit region 806 located on at least one side of the display region 804.

The touch display device 800 may also include a camera, a home button, a speaker, a microphone, a CPU, memories, and other appropriate components (not shown). The integrated touch control display panel according to the present disclosure may reduce the signal interference from the peripheral circuit region to the touch control electrodes in the display region to achieve desirable touch control performance.

The touch display device 800 may also be a computer display, or other devices with touch display screens. Specifically, such touch display device may include the integrated touch control display panel according to the present disclosure.

Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An integrated touch control display panel, comprising:
    a display region and a peripheral circuit region disposed on at least one side of the display region; and
    an array substrate and a color film substrate facing toward the array substrate,
    wherein:
    the display region includes a plurality of stripe-shaped touch control electrodes,
    the plurality of stripe-shaped touch control electrodes are extending in a first direction and sequentially arranged in a second direction intersecting the first direction,
    defining a width of a gap between the peripheral circuit region and a closest stripe-shaped touch control electrode in the second direction as a first width, and defining a width of a gap between any two adjacent stripe-shaped touch control electrodes as a second width, the first width is greater than the second width,
    the plurality of stripe-shaped touch control electrodes operate as a plurality of touch control driving electrodes, and the integrated touch control display panel further includes a plurality of touch control detecting electrodes intersecting the plurality of touch control driving electrodes, or
    the plurality of stripe-shaped touch control electrodes operate as a plurality of touch control detecting electrodes, and the integrated touch control display panel further includes a plurality of touch control driving electrodes intersecting the plurality of touch control detecting electrodes, and
    one of the plurality of touch control driving electrodes and the plurality of touch control detecting electrodes are disposed on the array substrate, and the other of the plurality of touch control driving electrodes and the plurality of touch control detecting electrodes are disposed on the color film substrate.

2. The integrated touch control display panel according to claim 1, wherein:
    the closest stripe-shaped touch control electrode is in a shape of wavy stripe;
    the wavy stripe includes a plurality of equal-length short slopes;
    a short slope has a middle point; and
    in the second direction, a distance between the middle point of the short slope of the closest stripe-shaped touch control electrode and an edge of the peripheral circuit region is the first width.

3. The integrated touch control display panel according to claim 2, wherein:
    the first width is equal to or greater than 1.4 times the second width.

4. The integrated touch control display panel according to claim 2, wherein:
    the first width is equal to or greater than 1.6 times the second width.

5. The integrated touch control display panel according to claim 1, wherein:
    the first width is equal to or greater than 1.4 times the second width.

6. The integrated touch control display panel according to claim 1, wherein:
    the first width is equal to or greater than 1.6 times the second width.

7. The integrated touch control display panel according to claim 1, further including:
    a common electrode layer,
    wherein:
    the common electrode layer is divided into a plurality of stripe-shaped electrodes that are insulated from each other,
    the plurality of stripe-shaped electrodes are extending in the first direction and sequentially arranged in the second direction, and
    the plurality of stripe-shaped electrodes operate as the plurality of stripe-shaped touch control electrodes.

8. The integrated touch control display panel according to claim 1, wherein:
    the peripheral circuit region includes a system bus sub-region and a TFT component sub-region;
    the system bus sub-region includes dynamically changing timing signal buses; and
    the peripheral circuit region has a first side close to the plurality of stripe-shaped touch control electrodes and an opposing second side far away from the plurality of stripe-shaped touch control electrodes, and the timing signal buses are located on the first side of the peripheral circuit region.

9. The integrated touch control display panel according to claim 1, wherein:
    the peripheral circuit region includes a system bus sub-region and a TFT component sub-region;
    the TFT component sub-region includes buffers; and
    the TFT component sub-region has a first side close to the plurality of stripe-shaped touch control electrodes and an opposing second side far away from the plurality of stripe-shaped touch control electrodes, and the buffers are located on the first side of the TFT component sub-region.

10. A touch display device, comprising an integrated touch control display panel, wherein the integrated touch control display panel comprises:
    a display region and a peripheral circuit region disposed on at least one side of the display region; and
    an array substrate and a color film substrate facing toward the array substrate,
    wherein:
    the display region includes a plurality of stripe-shaped touch control electrodes,
    the plurality of stripe-shaped touch control electrodes are extending in a first direction and sequentially arranged in a second direction intersecting the first direction,
    defining a width of a gap between the peripheral circuit region and a closest stripe-shaped touch control electrode in the second direction as a first width, and defining a width of a gap between any two adjacent stripe-shaped touch control electrodes as a second width, the first width is greater than the second width,
    the plurality of stripe-shaped touch control electrodes operate as a plurality of touch control driving electrodes, and the integrated touch control display panel further includes a plurality of touch control detecting electrodes intersecting the plurality of touch control driving electrodes, or
    the plurality of stripe-shaped touch control electrodes operate as a plurality of touch control detecting electrodes, and the integrated touch control display panel further includes a plurality of touch control driving electrodes intersecting the plurality of touch control detecting electrodes, and one of the plurality of touch control driving electrodes and the plurality of touch control detecting electrodes are disposed on the array substrate, and the other of the plurality of touch control driving electrodes and the plurality of touch control detecting electrodes are disposed on the color film substrate.

11. The touch display device according to claim 10, wherein:
the closest stripe-shaped touch control electrode is in a shape of wavy stripe;
the wavy stripe includes a plurality of equal-length short slopes;
a short slope has a middle point; and
in the second direction, a distance between the middle point of the short slope of the closest stripe-shaped touch control electrode and an edge of the peripheral circuit region is the first width.

12. The touch display device according to claim 11, wherein:
the first width is equal to or greater than 1.4 times the second width.

13. The touch display device according to claim 11, wherein:
the first width is equal to or greater than 1.6 times the second width.

14. The touch display device according to claim 10, wherein:
the first width is equal to or greater than 1.4 times the second width.

15. The touch display device according to claim 10, wherein:
the first width is equal to or greater than 1.6 times the second width.

16. The touch display device according to claim 10, wherein:
the integrated touch control display panel further includes a common electrode layer,
wherein:
the common electrode layer is divided into a plurality of stripe-shaped electrodes that are insulated from each other,
the plurality of stripe-shaped electrodes are extending in the first direction and sequentially arranged in the second direction, and
the plurality of stripe-shaped electrodes operate as the plurality of stripe-shaped touch control electrodes.

17. The touch display device according to claim 10, wherein:
the peripheral circuit region of the integrated touch control display panel includes a system bus sub-region and a TFT component sub-region;
the system bus sub-region includes dynamically changing timing signal buses; and
the peripheral circuit region has a first side close to the plurality of stripe-shaped touch control electrodes and an opposing second side far away from the plurality of stripe-shaped touch control electrodes, and the timing signal buses are located on the first side of the peripheral circuit region.

18. The touch display device according to claim 10, wherein:
the peripheral circuit region of the integrated touch control display panel includes a system bus sub-region and a TFT component sub-region;
the TFT component sub-region includes buffers; and
the TFT component sub-region has a first side close to the plurality of stripe-shaped touch control electrodes and an opposing second side far away from the plurality of stripe-shaped touch control electrodes, and the buffers are located on the first side of the TFT component sub-region.

* * * * *